United States Patent
Veloskey et al.

(10) Patent No.: US 6,220,636 B1
(45) Date of Patent: Apr. 24, 2001

(54) SWIVEL COUPLING FOR A POOL CLEANER

(75) Inventors: Thomas E. Veloskey, San Marcos; Gerhardus J. Stolz, San Diego, both of CA (US)

(73) Assignee: Polaris Pool Systems, Inc., Vista, CA (US)

( * ) Notice: Subject to any disclaimer, the term of this patent is extended or adjusted under 35 U.S.C. 154(b) by 0 days.

(21) Appl. No.: 09/494,887

(22) Filed: Jan. 31, 2000

Related U.S. Application Data
(60) Provisional application No. 60/118,391, filed on Feb. 1, 1999.

(51) Int. Cl.[7] .................................................. F16L 27/08
(52) U.S. Cl. ............................ 286/261; 285/263; 285/272
(58) Field of Search ................................... 285/261, 263, 285/271, 272

(56) References Cited

U.S. PATENT DOCUMENTS

| | | | |
|---|---|---|---|
| 939,908 | * 11/1909 | Greenlaw | 285/272 |
| 1,779,936 | * 10/1930 | Hess | 285/272 |
| 3,727,954 | * 4/1973 | Oliver | 285/263 |
| 4,165,107 | * 8/1979 | Affa et al. | 285/263 |

* cited by examiner

*Primary Examiner*—Eric K. Nicholson
(74) *Attorney, Agent, or Firm*—Kelly Bauersfeld Lowry & Kelley, LLP

(57) ABSTRACT

An improved swivel coupling is provided for use with a pool cleaner, particularly for use in connecting a pool cleaner of the type powered by a suction or vacuum source to a flexible vacuum hose which is connected in turn to the suction side of conventional pool water filtration equipment. The swivel coupling comprises outer and inner part-spherical ball segments adapted for respective connection to the vacuum hose and to a water flow port on the pool cleaner, wherein the outer ball segment defines a socket for rotationally receiving and supporting the inner ball segment in a manner to accommodate substantial angular and rotational swivel displacement therebetween. A plurality of generally axially extending ribs are formed within the socket for rotationally supporting the inner ball segment with minimal contact area, and to define therebetween a plurality of axially elongated recessed channels. The socket further includes an annular and relatively narrow width seal ring disposed generally at a distal end thereof for normally engaging the inner ball segment to restrict ingestion of debris and grit to the interface between the outer and inner ball segments. Any ingested grit and debris tends to flush through the recessed channels for passage to the pool filtration equipment, substantially without binding or interfering with relatively free swivel movement of the coupling.

14 Claims, 3 Drawing Sheets

SWIVEL COUPLING FOR A POOL CLEANER

This application claims benefit of Provisional appl. Ser. No. 60/118,391, filed Feb. 1, 1999.

BACKGROUND OF THE INVENTION

This invention relates generally to pool cleaning systems of the type including a so-called automatic pool cleaning device adapted to traverse submerged surfaces of a swimming pool or the like to pick up and collect accumulated debris such as leaves, twigs, sand and silt. More particularly, this invention relates to an improved swivel coupling for interconnecting a pool cleaner with a flexible hose or the like used for coupling the pool cleaner to an hydraulic power source such as a suction or vacuum source by connection to the suction side of a conventional pool water filtration system. The improved swivel coupling of the present invention is designed to provide substantial and relatively free rotational swivel displacement between the hose and the pool cleaner, substantially without binding or interference attributable to ingestion of debris and grit.

Pool cleaner systems and related devices are generally well known in the art for use in maintaining residential and commercial swimming pools in a clean and attractive condition. In this regard, swimming pools conventionally include a water filtration system equipped with a pump for drawing or suctioning water from the pool for circulation through a filter canister having filter media therein to remove and collect water-entrained debris such as leaves and twigs as well as fine particulate including sand and silt. In a typical arrangement, at least a portion of the pool water is vacuum-drawn over a weir mounted within a so-called skimmer well positioned substantially at the water surface to draw and collect floating debris to the filter equipment. From the filter canister, the water is recirculated to the pool via one or more return lines. Such filtration equipment is normally operated for several hours on a daily basis and serves, in combination with traditional chemical treatments such as chlorination or the like, to maintain the pool water in a clean and clear sanitary state.

The water filtration system is generally ineffective, however, to filter out debris which settles onto submerged floor and side wall surfaces of the swimming pool. In the past, settled debris has typically been removed by coupling a vacuum hose to the suction side of the pool water filtration system, such as by connecting the vacuum hose to the skimmer well located near the water surface at one side of the pool, and then manually moving a vacuum head coupled to the hose over the submerged pool surfaces to vacuum settled debris directly to the filter canister where it is collected and separated from the pool water. However, manual vacuuming of a swimming pool is a labor intensive task and is thus not typically performed by the pool owner or pool cleaning service personnel on a daily basis.

So-called automatic pool cleaner devices have been developed over the years for cleaning submerged pool surfaces, thereby substantially eliminating the need for labor intensive manual vacuuming. Such automatic pool cleaners typically comprise a relatively compact cleaner housing or head coupled to the pool water filtration system by a hose and including water-powered means for causing the cleaner to travel about within a swimming pool to dislodge and collect settled debris. In one form, the pool cleaner is connected to the return or pressure side of the filtration system for receiving positive pressure water which powers a turbine for rotatably driving cleaner wheels, and also functions by venturi action to draw settled debris into a filter bag. See, for example, U.S. Pat. Nos. 3,882,574; 4,558,479; 4,589,986; and 4,734,954. In another form, the pool cleaner is coupled by a vacuum hose to the suction side of the filtration system, whereby water is drawn through the pool cleaner to operate a drive mechanism for transporting the cleaner within the pool while vacuuming settled debris to the filter canister of the pool filtration system. See, for example, U.S. Pat. Nos. 3,803,658; 4,023,227; 4,133,068; 4,208,752; 4,643,217; 4,679,867; 4,729,406; 4,761,848; 5,105,496; 5,265,297; and 5,634,229. See also, copending U.S. Ser. No. 09/090,894, filed Jun. 4, 1998, and U.S. Ser. No. 09/176,532, filed Oct. 21, 1998.

In a typical pool cleaner installation, one or more swivel couplings are installed along the length of the flexible hose to enable the pool cleaner to travel a substantially random path to traverse and clean submerged pool surfaces, without significant hose twisting which could otherwise impact and restrict random cleaner travel. In this regard, the pool cleaner installation normally includes a swivel coupling for interconnecting a distal end of the flexible hose to a water flow port on the pool cleaner. Additional swivel couplings may also be installed in-line along the length of the hose, if desired. However, particularly with a suction powered pool cleaner wherein water is drawn through the flexible hose at a negative pressure, these swivel couplings are susceptible to ingestion of debris such as fine dirt and grit. Such ingested dirt and grit can accumulate between moving surfaces of the coupling and eventually cause the coupling to bind or lock up. When this occurs, it is necessary to disassemble the swivel coupling for cleaning, or to replace it.

The present invention relates to an improved swivel coupling for use with a pool cleaner, particularly of the suction powered type, wherein the swivel coupling is resistant to ingestion of debris such as dirt and grit, and further wherein any ingested dirt and grit is flushed through the swivel coupling to prevent accumulation therein.

SUMMARY OF THE INVENTION

In accordance with the invention, an improved swivel coupling is provided for connection along the length of a flexible cleaner hose coupled between a pool cleaner and pool water filtration equipment. The swivel coupling is particularly designed for use with a pool cleaner of the type powered by a vacuum or suction source, wherein the cleaner hose is coupled to the suction side of the filtration equipment. The swivel coupling comprises an inner ball segment rotatably supported with minimal surface contact area within an outer ball segment, and wherein the two ball segments cooperatively define therebetween recessed channels for flow of debris and grit away from the rotatable interface.

In the preferred form, the outer ball segment comprises a ball-shaped socket having a size and shape for snap-fit reception of a matingly shaped ball formed as part of the inner ball segment. The outer and inner ball segments each further include a sleeve-shaped cuff or fitting for suitable connection, for example, respectively to the flexible hose and to the pool cleaner, or alternately for in-line connection along the length of the hose. The assembled outer and inner ball segments define an uninterrupted flow passage therethrough, while accommodating substantially full circle rotation and a significant degree of angular deflection therebetween.

The socket of the outer ball segment includes a radially inwardly extending annular wiper seal formed substantially at a distal end thereof, for slidably engaging the exterior surface of the ball on the inner ball segment to restrict ingestion of dirt and grit to the ball-socket interface. This wiper seal has a relatively narrow axial width to minimize surface contact area between the ball and socket. A plurality of axially elongated and radially inwardly protruding ribs are also formed within the socket to extend axially from the wiper seal in circumferentially spaced relation toward the associated cuff of the outer ball segment, wherein these ribs have a relatively narrow circumferential width to minimize surface contact area with between the ball and socket. These ribs cooperatively define a plurality of axially elongated recessed channels within the socket, wherein any debris ingested to the ball-socket interface is drawn through these recessed channels for flow through the associated cuff and hose to the pool filtration equipment.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
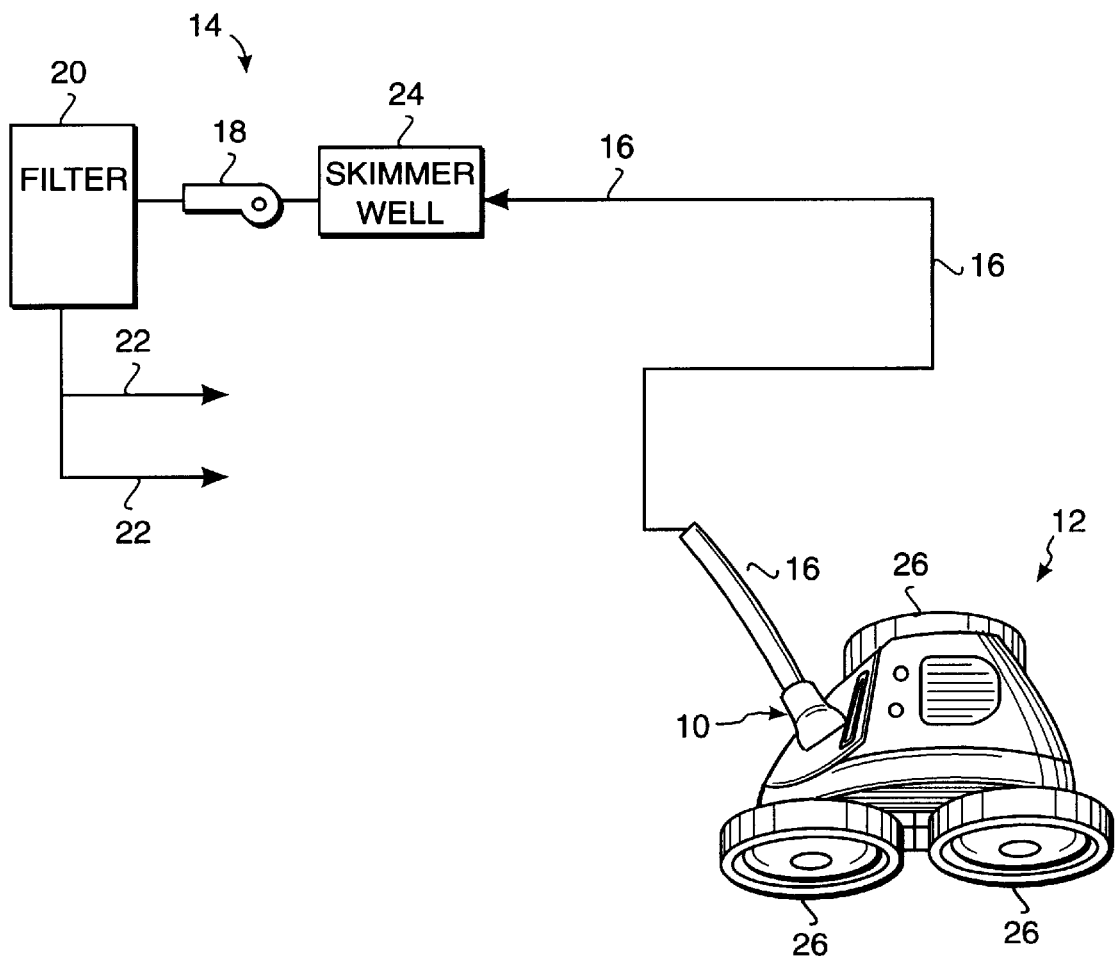
FIG. 1 is a schematic representation of a swimming pool filtration system in combination with a suction-powered pool cleaner for cleaning submerged pool floor and side wall surfaces, and further including an improved swivel coupling of the present invention.
Figure 2:
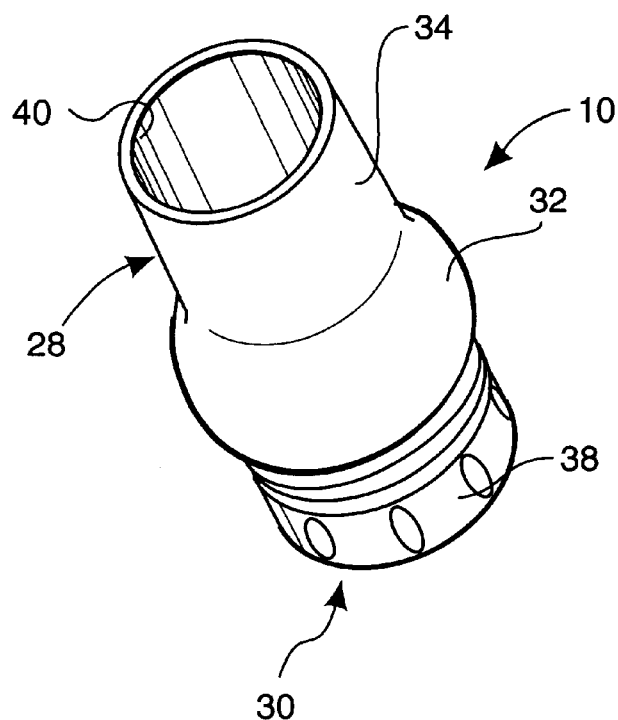
FIG. 2 is a perspective view of the improved swivel coupling.
Figure 3:
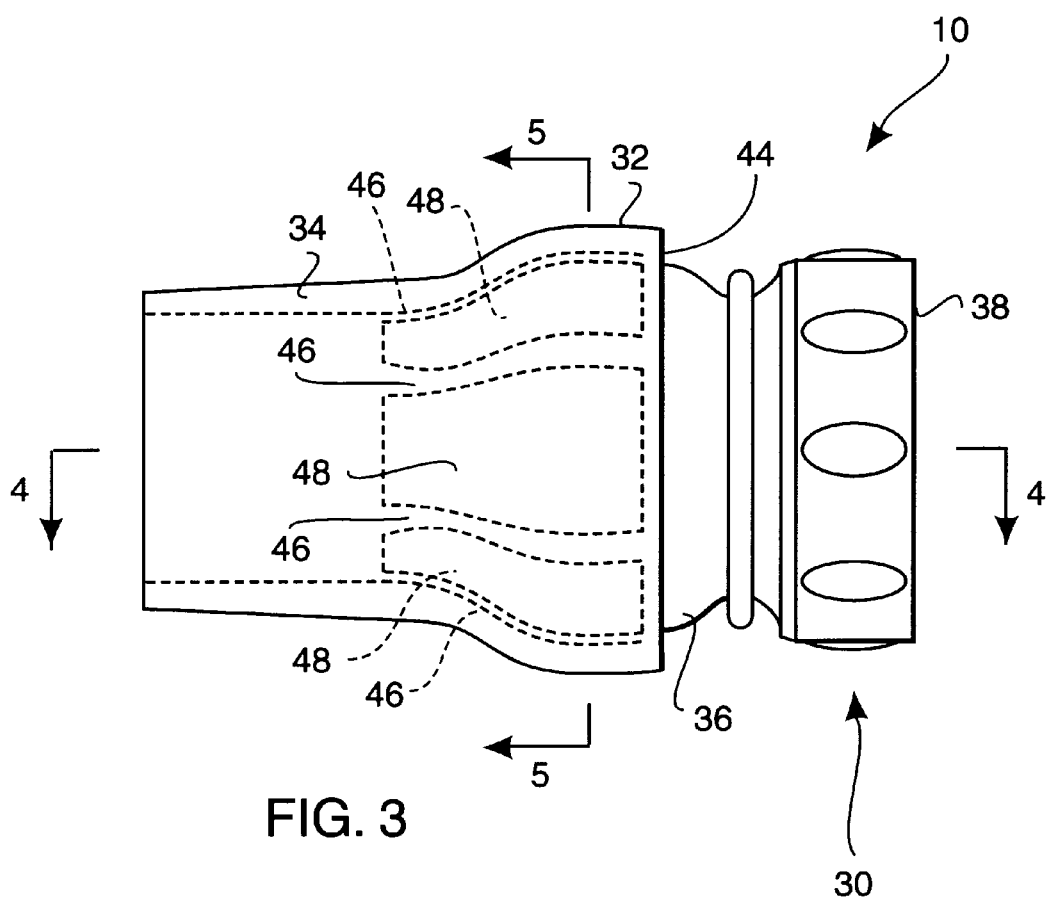
FIG. 3 is an enlarged side elevation view of the swivel coupling.
Figure 4:
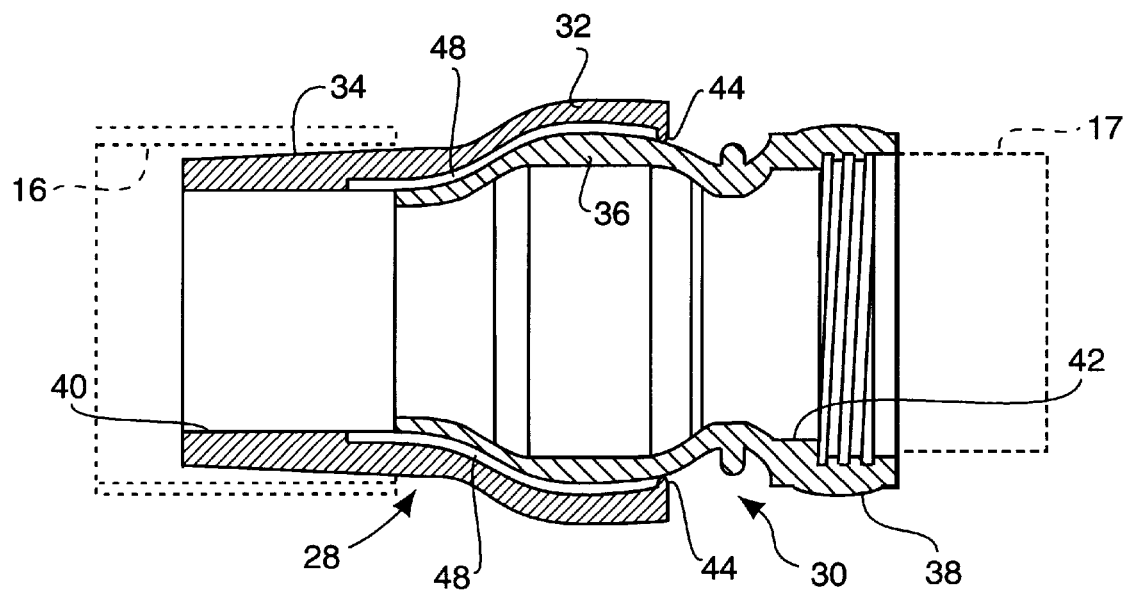
FIG. 4 is a longitudinal vertical sectional view taken generally on the line 4—4 of FIG. 3.
Figure 5:
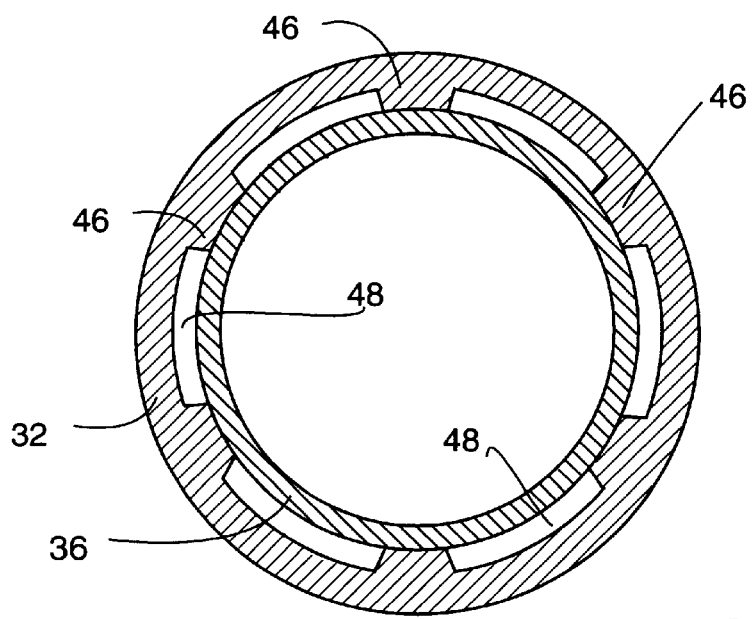
FIG. 5 is a transverse vertical sectional view taken generally on the line 5—5 of FIG. 3.

As shown in the exemplary drawings, an improved swivel coupling referred to generally in FIGS. 1–5 by the reference numeral 10 is provided for use in a water filtration and cleaning system for a swimming pool or the like, wherein the swivel coupling 10 is used in combination with a pool cleaner 12 (FIG. 1) for cleaning debris such as leaves and twigs as well as small particulate such as sand and silt settled onto submerged floor and wall surfaces of the swimming pool. The illustrative pool cleaner 12 is powered by a suction or vacuum source, such as a conventional pool water filtration system 14 as depicted schematically in FIG. 1, by connection to the filtration system via a flow conduit such as a flexible vacuum hose 16. In a preferred form, the swivel coupling 10 is mounted at a distal end of the vacuum hose 16 for connection to a water flow port 17 (FIG. 4) on the pool cleaner 12 to accommodate substantial and relatively free or unrestricted rotational and angular displacement between the pool cleaner 12 and the hose 16.

The pool water filtration system 14 conventionally includes a pump 18 for drawing water from the swimming pool for passage through a filter canister 20 having a selected filtration media (not shown) contained therein for capturing and collecting silt and grit and other particulate debris matter entrained in the water flow stream. The thus-filtered water is then recirculated to the swimming pool through one or more return conduits 22. In a typical water filtration system, at least a portion of the water drawn from the pool by the pump 18 is drawn through a skimmer well 24 which is normally mounted at one edge of the pool generally at the water's surface and includes a weir (not shown) over which water is drawn to skim and collect debris floating on the surface of the pool water.

When a suction-powered pool cleaner 12 is coupled with the filtration system 14 for enhanced cleaning of pool surfaces, the vacuum hose 16 is often connected (as viewed schematically in FIG. 1) to extend between the skimmer well 24 and the pool cleaner. Alternately, it will be recognized and understood that some swimming pools may be equipped with a dedicated suction cleaner flow line (not shown) coupled directly from the pool wall to the filtration system 14, in which case the vacuum hose 16 would be coupled to said suction flow line. In either case, the filtration system 14 draws water from the swimming pool through the cleaner 12 and further through the vacuum hose 16 to the pump 18 for delivery in turn to the filter canister 20. This vacuum or suction water flow drawn through the pool cleaner 12 provides a power source for rotatably driving the pool cleaner in a manner achieving substantially random travel of the cleaner throughout the pool to dislodge and vacuum debris settled upon submerged pool floor and side wall surfaces. While the specific type of suction-powered pool cleaner may vary, one preferred pool cleaner is constructed as shown and described in copending U.S. Ser. No. 09/090,894, filed Jun. 4, 1998, which is incorporated by reference herein. Such pool cleaner, as illustrated generally in FIG. 1, incorporates internal drive means (not shown) for rotatably driving one or more cleaner wheels 26 for transporting the pool cleaner throughout the pool, together with means for vacuuming settled debris to the vacuum hose 16. Other exemplary suction powered pool cleaners are shown and described, by way of example, in U.S. Pat. Nos. 3,803,658; 4,023,227; 4,133,068; 4,208,752; 4,643,217; 4,679,867; 4,729,406; 4,761,848; 5,105,496; 5,265,297; and 5,634,229. See also copending U.S. Ser. No. 09/176,532, filed Oct. 21, 1998.

In general terms, the swivel coupling 10 of the present invention comprises a movably interfitting pair of part-spherical segments adapted for respective connection to the hose 16, and to the pool cleaner 12. These part-spherical segments include an outer ball segment 28 having an inner ball segment 30 received and supported therein in a manner permitting rotational and angular displacement therebetween. The outer and inner ball segments 28, 30 define a part-spherical joint interface which, in accordance with the invention, is designed to restrict or minimize ingestion of fine dirt and grit which could otherwise accumulate at the joint interface and ultimately cause the swivel coupling to bind and fail. Instead, the improved swivel coupling 10 includes means for flushing any debris ingested to the joint interface, thereby insuring reliable and relatively free swivel displacement. While the improved swivel coupling 10 is shown and described herein for installation between the flexible hose and a pool cleaner of the suction powered type, it will be recognized and understood that the coupling may be adapted for in-line installation along the length of the flexible hose, and further that the coupling may also be used with a pool cleaner of the pressure powered type.

As shown best in FIGS. 2–5, the outer and inner ball segments 28, 30 of the improved swivel coupling 10 may conveniently comprise a pair of lightweight and relatively economical components of molded plastic or the like. The outer ball segment 28 comprises a generally tubular component defining a part-spherical socket 32 at one end and a sleeve-shaped cuff 34 at an opposite end. The cuff 34 is adapted for suitable connection to the distal end of the flexible hose 16, as by a press-fit or adhesive connection. Alternately, if desired, cuff connection with the hose 16 may be accomplished by a peripheral clamp (not shown).

The inner ball segment 30 also comprises a generally tubular component enlarged at one end to define a part-spherical ball 36 having a size and shape for seated reception into and swivel support within the socket 32. In this regard, the ball 36 may be adapted for snap-fit mounting into the socket 32. The opposite end of the inner ball segment 30 is shown in the form of an internally threaded fitting 38 adapted for thread-on connection with the water flow port 17 (FIG. 4) on the pool cleaner 12. Importantly, the interfitting socket 32 and ball 36 of the two ball segments 28, 30 accommodate substantially full circle rotation and a significant degree of angular deflection in any direction therebetween. Moreover, the outer ball segment 28 defines a flow path 40, and the inner ball segment 30 defines a flow path 42, wherein these flow paths 40, 42 cooperatively form an uninterrupted passage through the swivel coupling 10. This uninterrupted passage remains open throughout the full range of rotational and angular displacement between the outer and inner ball segments 28, 30.

The interior surface of the socket 32 is shaped to restrict ingestion of dirt and grit to a location between the socket 32 and the ball 36. In this regard, a distal end of the socket 32 is internally lined by a radially inwardly protruding annular seal ring or wiper seal 44 for engaging the exterior part-spherical surface of the ball 36. This seal ring 44 has a relatively narrow axial width to minimize surface contact area between the socket 32 and the ball 36, yet forms an effective wiper seal to restrict debris ingestion particularly in response to cleaner operation wherein the hose 16 couples water under vacuum or negative pressure to the pool cleaner.

In accordance with a further primary aspect of the invention, the interior surface of the socket 32 further includes a plurality of generally axially elongated and radially inwardly protruding ribs 46 (shown best in FIGS. 3 and 5) which engage and support the ball 36 with a minimal surface area of contact. As shown best in FIG. 3, these ribs 46 extend from the seal ring 44 generally in parallel relation over the socket portion 32 of the outer ball segment 28, terminating generally at the juncture with the cuff 34. The ribs 46 define a corresponding plurality of radially inwardly open shallow recessed channels 48 positioned circumferentially about the ball 36. These channels 48 have open proximal ends, at the juncture between the socket 32 and the cuff 34. While the number of ribs 46 and related channels 48 may vary, the illustrative drawings depict six equiangularly spaced ribs defining a correspondingly number of six equiangularly spaced channels.

In operation, when the pool cleaner 12 is coupled by the flexible hose 16 to the suction side of the pool water filtration equipment 14, water under negative pressure flows through the swivel coupling 10. The seal ring 44 slidably engages the exterior part-spherical surface of the ball 36 to restrict vacuum-induced ingestion of fine dirt and grit to the part-spherical interface between the outer and inner ball segments 28, 30, while simultaneously permitting relative rotation and substantial angular displacement therebetween. In the event that any dirt or grit is ingested past the seal ring 44 to the part-spherical interface, such ingested matter is drawn into the recessed channels 48 and tends not to lodge in the relatively small surface contact areas between the ribs 46 and the exterior of the ball 36. From the channels 48, such ingested matter is drawn with a flushing action axially downstream through the cuff 34 and further through the hose 16 to the filtration equipment 14 for collection. Such flushing action is particularly effective each time the filtration system is turned on, since the interfitted ball segments 28, 30 of the swivel coupling 10 tend to relax when the filtration system is turned off. Resumed application of negative pressure to the flow passage through the swivel coupling, when the filtration system is turned on, typically results in a brief but relatively significant flush flow to sweep debris from the channels 48 as the seal ring 44 is drawn into relatively tight sealing engagement with the ball 36.

A variety of modifications and improvements in and to the swivel coupling 10 of the present invention will be apparent to those persons skilled in the art. Accordingly, no limitation on the invention is intended by way of the foregoing description and accompanying drawings, except as set forth in the appended claims.

What is claimed is:

1. A swivel coupling for connection along the length of a flexible cleaner hose coupled between a pool cleaner and pool water filtration equipment, said swivel coupling comprising:

an outer ball segment having a socket of generally part-spherical shape;

an inner ball segment having a ball of generally part-spherical shape, said ball being supported within said socket to permit rotational and angular displacement therebetween, said outer and inner ball segments defining an uninterrupted flow passage therethrough;

said outer and inner ball segments being formed from molded plastic; and means for coupling said outer and inner ball segments in-line with the cleaner hose;

said socket having an interior surface including a radially inwardly extending wiper seal for slidably engaging an exterior surface of said ball to restrict ingestion of particulate debris between said socket and ball;

said interior surface of said socket further including a plurality of recessed channels formed therein and extending generally axially from said wiper seal to accommodate flow of any particulate debris between said socket and ball to the cleaner hose.

2. The swivel coupling of claim 1 wherein said wiper seal has a relatively narrow axial width for substantially minimal surface area contact with said exterior surface of said ball.

3. The swivel coupling of claim 1 wherein said plurality of recessed channels are defined by a plurality of radially inwardly extending ribs formed on said interior surface of said socket for slidably engaging the exterior surface of said ball, said ribs extending axially from said wiper seal in circumferentially spaced relation to define said recessed channels.

4. The swivel coupling of claim 3 wherein said ribs each have a relatively narrow axial circumferential width for substantially minimal surface area contact with said exterior surface of said ball.

5. The swivel coupling of claim 1 wherein said means for coupling said outer and inner ball segments in-line with the cleaner hose comprises a generally sleeve-shaped cuff carried by one of said outer and inner ball segments, and a threaded fitting carried by the other of said outer and inner ball segments.

6. The swivel coupling of claim 5 wherein said cuff is carried by said outer ball segment, and further wherein said threaded fitting is carried by said inner ball segment.

7. The swivel coupling of claim 1 wherein said ball has a size and shape for snap-fit mounting into said socket.

8. A swivel coupling in combination with a cleaner hose for coupling a pool cleaner with pool water filtration equipment, comprising:

an outer ball segment having a socket of generally part-spherical shape; and an inner ball segment having a ball of generally part-spherical shape, said ball being supported within said socket to permit rotational and angular displacement therebetween, said outer and inner ball segments defining an uninterrupted flow passage therethrough;

said outer and inner ball segments including means for connecting the swivel coupling in-line with said cleaner hose;

said socket having an interior surface including a radially inwardly extending wiper seal formed generally at a distal end thereof for slidably engaging an exterior surface of said ball to restrict ingestion of particulate debris between said socket and ball;

said interior surface of said socket further including a plurality of radially inwardly extending ribs for slidably engaging the exterior surface of said ball and extending axially from said wiper seal in circumferentially spaced relation to define a plurality of generally axially elongated recessed channels to accommodate flow of any particulate debris between said socket and ball in a direction away from said wiper seal.

9. The swivel coupling of claim 8 wherein said wiper seal has a relatively narrow axial width for substantially minimal surface area contact with said exterior surface of said ball.

10. The swivel coupling of claim 8 wherein said ribs each have a relatively narrow axial circumferential width for substantially minimal surface area contact with said exterior surface of said ball.

11. The swivel coupling of claim 8 further including means carried by said outer and inner ball segments for coupling the swivel coupling in-line with a flow conduit.

12. The swivel coupling of claim 11 wherein said coupling means comprises a generally sleeve-shaped cuff carried by said outer ball segment, and a threaded fitting is carried by said inner ball segment.

13. The swivel coupling of claim 8 wherein said ball has a size and shape for snap-fit mounting into said socket.

14. A swivel coupling, comprising:

an outer ball segment having a socket of generally part-spherical shape; and an inner ball segment having a ball of generally part-spherical shape, said ball having a size and shape for snap-fit mounting within said socket to permit rotational and angular displacement therebetween, said outer and inner ball segments defining an uninterrupted flow passage therethrough;

said socket having an interior surface including a radially inwardly extending wiper seal formed generally at a distal end thereof for slidably engaging an exterior surface of said ball to restrict ingestion of particulate debris between said socket and ball;

said interior surface of said socket further including a plurality of radially inwardly extending ribs for slidably engaging the exterior surface of said ball and extending axially from said wiper seal in circumferentially spaced relation to define a plurality of generally axially elongated recessed channels to accommodate flow of any particulate debris between said socket and ball in a direction away from said wiper seal.

\* \* \* \* \*